April 8, 1958 J. H. GREENWOOD 2,830,130

MEANS FOR REPRODUCING MAGNETIC RECORDINGS

Filed June 12, 1951

INVENTOR

JAMES H. GREENWOOD,

BY J. Harold Kilcoyne

ATTORNEY 2,830,130
Patented Apr. 8, 1958

2,830,130

MEANS FOR REPRODUCING MAGNETIC RECORDINGS

James H. Greenwood, Pittsburgh, Pa.

Application June 12, 1951, Serial No. 231,191

3 Claims. (Cl. 179—100.2)

This invention relates to improvements in means for reproducing magnetic recordings.

As is well known, systems for reproducing magnetic recordings currently in general use employ a magnetic transducer connected to the input of an amplifier and a loud speaker or other output device connected to the output of the amplifier. There is also provided a suitable power supply for the amplifier. The magnetic transducer consists of a core of magnetic material bearing a winding, and in which there is a gap of non-magnetic material. Such a magnetic transducer is disclosed in United States Patent No. Re. 23,311, granted December 26, 1950, to M. Camras. When the gap in the core of the magnetic transducer is positioned adjacent to a magnetic record and the record is moved with respect to the transducer, a flux of varying magnitude is coupled into the core from the magnetic record. The flux in the core of the transducer more specifically changes in flux as the record moves, induces voltages in the winding of the core, which voltages are amplified by the amplifier and delivered to the output device. It will be observed that in such a system of reproduction voltages are produced in the winding only if the flux changes.

One type of amplifier which it is possible to use in a reproduction system as aforesaid is a magnetic amplifier. Such an amplifier may take numerous forms but all contain certain common elements. One element is called a saturable reactor or sometimes a magnetic modulator, a technical explanation of the operation thereof being found in an article entitled "Some General Properties of Magnetic Amplifiers," by J. M. Manley, I. R. E. Proceedings, March 1951. Such a saturable reactor or magnetic modulator consists of a core of magnetic material on which there are one or more windings. A magnetic amplifier may use one or more than one saturable reactor. The signal to be amplified is connected to one or more windings of the saturable reactor(s), called the input winding(s). The function of the input winding(s) is to enable an electric current to be coupled to the flux path in the core of the saturable reactor in such manner that it controls the output from the saturable reactor. The power required by a magnetic amplifier is alternating current, of a frequency higher than the highest frequency to be amplified. This power supply is connected to another winding or windings, called the excitation winding(s). From another winding or windings is taken the output from the saturable reactor. The arrangement of the core, and the windings on the core, may have various forms. Furthermore, the various windings referred to may be combined in various ways. But with all such arrangements, the output from a saturable reactor is not of the same character as the input but, rather, is alternating current of a higher frequency having an amplitude controlled by the input.

Another element necessary in a magnetic element amplifier is a rectifier, or detector, or demodulator, which may also take various forms. Its function is to convert the variable amplitude alternating current output from the saturable reactor into a varying current differing from the input in no essential characteristic except amplitude.

When a magnetic transducer is connected to the input of a magnetic amplifier as aforesaid, the flux in the core of the transducer is coupled into the core of the saturable reactor in the amplifier by connected windings, the one on the core of the transducer, and the input winding(s) of the saturable reactor. Several advantages are obtained by eliminating these windings and arranging the core of the saturable reactor so that the flux from the magnetic record can be coupled into it directly, as distinguished from the above described prior arrangements, wherein the flux of the magnetic record is converted to a current in the winding of the transducer and in turn is reconverted to a flux by the input winding of the saturable reactor.

Among such advantages may be noted simplification of reproducing equipment since the transducer may itself function as a magnetic amplifier receiving power and transferring it to an output circuit in quantities determined by the intensity of magnetization of the magnetic record (tape); improved reproduction through amplification of the magnetic flux which constitutes the recording, as distinguished from amplification of voltages produced by changes of flux coupled into either a conventional or a magnetic amplifier separate from the transducer; reproduction of magnetic records of signal frequencies approaching zero cycles per second; improved reproduction through a uniform amplitude response over a wide range of frequencies and an output signal amplitude which is significantly greater than from conventional transducers; reproduction of magnetic records by means of a reproducing device incorporating the functions of a transducer and magnetic amplifier but without any requirement of an integrating circuit connected to its output; a unitary transducer-magnetic amplifier device having an improved signal to noise ratio, and one that may be used in reproducing magnetic tapes driven at very slow speeds; and a marked simplification in the equipment required to reproduce multiple-track magnetic records.

Stated generally, the object of the invention is the provision of an improved system for and an improved method of reproducing magnetic records, as well as a reproducing device which is useful in carrying out the practice of the aforesaid method, by which the advantages enumerated above may be obtained in simple yet highly effective manner.

Other and further objects of the invention will be seen from the following detailed description, taken with the accompanying drawings, in which.

Figure 1:
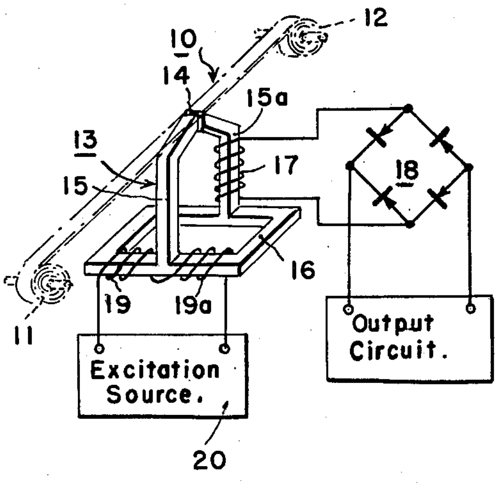
Fig. 1 is a block diagram schematically illustrating the improved reproducing device and associated equipment used in reproducing magnetic records according to the invention.

Before proceeding to a detailed description of the improved reproducing (transducer-magnetic amplifier) device of the invention, reference is had to Fig. 1 which schematically illustrates such a reproducing device and the manner in which it is connected into an associated circuit for reproducing magnetic records as herein contemplated. Reference numeral 10 designates the magnetic record which is stored on conventional reels 11, 12, of which the take-up reel 12 may be powered, as usual. Said record is positioned adjacent to a reproducing device generally designated by the numeral 13 which has a gap 14 of non-magnetic material. Illustratively, said gap is provided between the adjacent end faces of two arms 15, **15*a* of magnetic material which together form a cross piece on a rectangular core member 16, also of magnetic material, and which with the cross piece provides a saturable reactor. The cross member bears an output winding 17 connected to an output circuit, which is so designated, through a rectifier 18, as is well known in reproducing systems employing a magnetic amplifier. On one side of the rectangular core 16 are two windings 19, 19*a* which together constitute an excitation winding connected to a power supply 20** such as an oscillation generator or other source of alternating current which will be hereinafter referred to as the excitation source. It will be understood that the power supply required for a magnetic amplifier consists of alternating current at a frequency higher than the highest frequency to be amplified and of sufficient amplitude to saturate at least a portion of the core of the saturable reactor during a portion of each cycle.

According to the aforesaid arrangement, flux from the increment portion of the magnetic record 10 spanned by the gap 14 generates a magnetic flux in the saturated core of the reproducing device 13. For reasons which will be later explained in detail, the excitation flux in the cross member (arms 15, **15*a*) of the core is reduced to zero twice during each cycle of current in the windings 19, 19*a*. The output winding 17 of the cross member of the core will therefore have induced in it a voltage of a frequency equal to twice the frequency of the alternating current from the excitation source 20 and having an amplitude determined by the input signal, i. e. the flux of the magnetic record. The modulated flux thus induces a voltage in the output winding 17 which, after demodulation by the rectifier, or detector, or demodulator 18**, is the amplified replica of the input flux, i. e. the flux of the magnetic record. It should be noted that the flux in the cross member of the core is never increased by the action of the saturable reactor; rather, the modulation is accomplished by a periodic reduction of the flux to zero. Thus, there is no tendency to erase the magnetic record.

It will now be seen that the reproducing device 13 combines the functions of the separate magnetic transducer and magnetic amplifier devices employed in the standard system for reproducing magnetic records, as explained above. Although representing a simple rearrangement of the magnetic amplifier of the type employed in conjunction with a separate magnetic transducer heretofore used in some recording systems employing the magnetic amplifier, it will be observed that the present reproducing device not only combines the functions of the separate transducer and magnetic amplifier devices but also that it eliminates the input winding conventionally employed on such a magnetic amplifier, giving the advantage that the magnetic flux which constitutes the recording on the magnetic tape being reproduced is itself amplified.

Figure 2:
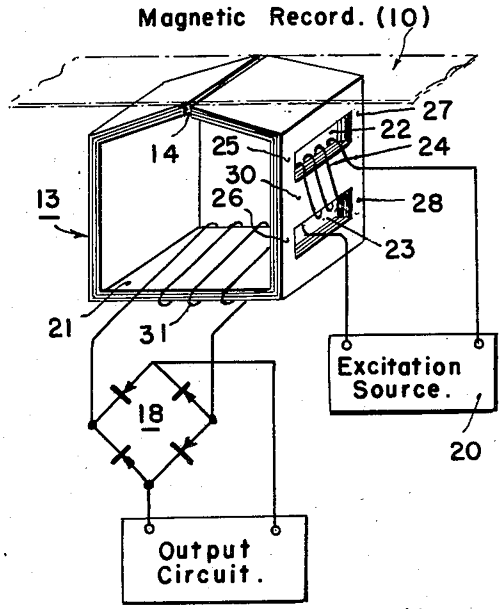
Figs. 2 and 3 illustrate various forms which a reproducing device according to the invention may take in actual practice.

Now referring to Fig. 2, such represents one possible form which a reproducing device functioning as above may take in actual practice. The saturable core 21 of the reproducing device 13 may have general box configuration as shown, with a gap 14 as in Fig. 1, and can be made of one or more laminations of suitable material, such as "Permalloy" or other magnetic material. The core is provided with recesses 22 and 23 which may be cut in one side thereof for the purpose of receiving the single excitation winding 24 and also for the purpose of providing magnetic paths 25, 26, 27 and 28 of greatly reduced cross section in the magnetic circuit of the core. The excitation winding 24 is positioned on a leg 30 of the core and is so oriented that the magnetic field set up by this winding traverses all of the aforesaid paths 25, 26, 27 and 28 substantially equally, in the absence of a magnetic record on the tape 10.

The winding 24 is connected to the excitation source 20 which provides the excitation current for this winding. Another portion of the core of the reproducing device 13 is provided with the output winding 31 which surrounds the full cross section of the core. This winding 31 is connected to the rectifier 18 which supplies the demodulated voltage to the output circuit.

The alternating current generated by the source 20 that is supplied to the excitation winding 24 sets up an alternating magnetic field around this winding. This magnetic field passes through the leg 30 of the core around which the winding 24 is wound and through the core portions 25, 26, 27 and 28 of reduced cross section. The excitation current passing through the winding 24 sets up a magnetic field that is more than sufficient to saturate the constricted portions 25, 26, 27 and 28 of the core during the portions of the cycle when the excitation current reaches its maxima. The frequency of the current generated by the source 20 is substantially higher than the highest signal frequency existing in the core 21 as a consequence of the movement of the tape 10 being reproduced.

Magnetic saturation of all the portions 25, 26, 27 and 28 of the core by the excitation current supplied to the winding 24 will occur at the same time that the magnetic field on the tape 10 is zero. If the magnetic field on the tape 10 is other than zero, this field will aid the excitation field in the portions 25 and 28, for example, while it opposes the excitation field in the portions 26 and 27, during one-half of the excitation field cycle, so that the portions 25 and 28 will be saturated before the portions 26 and 27. On the other hand, during the other half of the excitation field cycle, the magnetic field of the tape will aid the excitation field in the portions 26 and 27 and oppose the excitation field in the portions 25 and 28. Magnetic saturation will occur in the portions 26 and 27 before it occurs in the portions 25 and 28 when the field from the tape aids the excitation field in the portions 26 and 27.

As a result of this action by the magnetic field of the tape 10, pulses of magnetic flux pass through the output winding 31 and induce voltage pulses therein. These pulses have amplitudes proportional to the rate of change of the flux, which in turn is proportional to the time interval between the saturation of the core portions 25 and 28, and the saturation of the core portions 26 and 27. This time interval is directly determined by the intensity of the flux coupled into the core from the magnetic record. Therefore, the magnitude of the voltage induced into the output winding 31 is determined by the intensity of the magnetic field of the magnetic record on the tape. Moreover, since the aforesaid reproducing device functions as a magnetic amplifier of the magnetic record, the voltage induced in the output winding 31 is substantially greater than the voltage that is induced in the output winding of a conventional magnetic transducer.

The output winding 31 being connected to the rectifier 18, the amplified pulses are then detected to eliminate the pulse frequency and produce a voltage varying only in accordance with the signal. If desired, this signal voltage may be further amplified and thereafter it may be reproduced by a suitable loud speaker or other transducer.

Figures 3, 4:
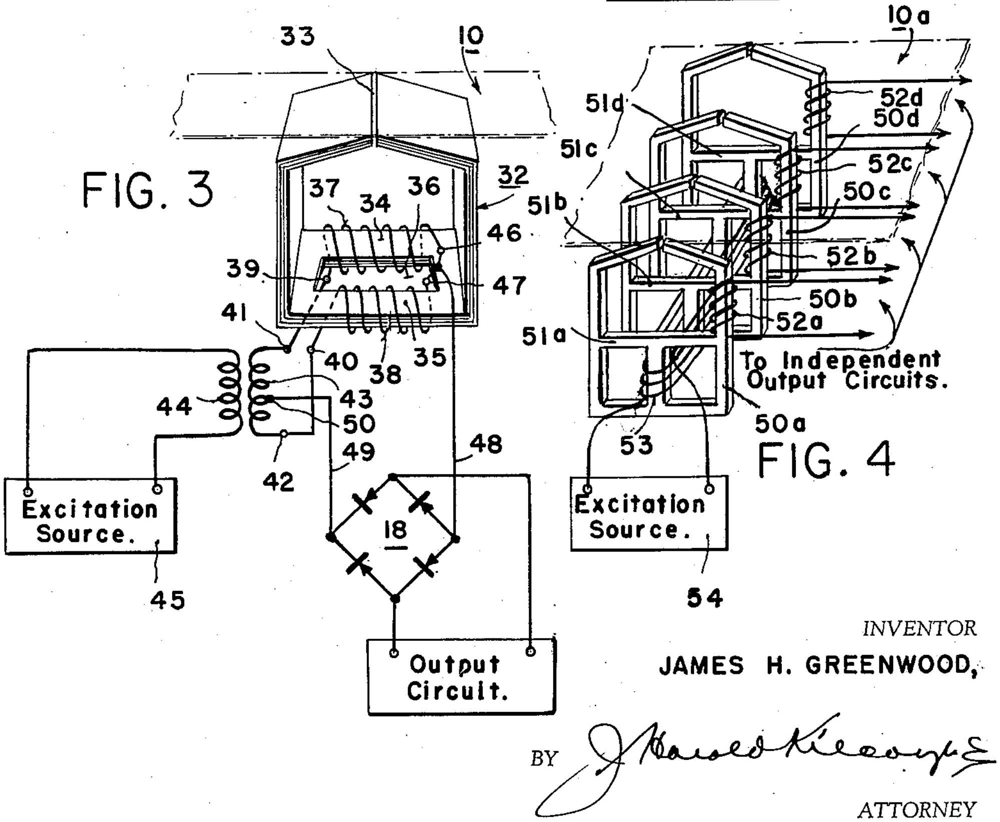
Fig. 4 is a schematic illustration of a modified form of a reproducing device operating in accordance with the principles of the invention applied to the simultaneous reproduction of multiple recordings on a multiple-track magnetic record, for example.

Fig. 3 illustrates another embodiment of a reproducing device according to the invention which combines in a single structure the functions of a magnetic transducer and a magnetic amplifier. As in the Fig. 2 form, the core 32 has general box formation and is provided with a non-magnetic gap 33. It may be of laminated construction and made from Permalloy or other suitable magnetic material. The saturable core 32 is formed to have two winding supporting portions 34 and 35 in one side thereof provided as by cutting a slot 36 in said side, the slot extending substantially parallel to the side edges of the core to define the two magnetic paths defined by the aforesaid supporting portions. These magnetic paths should be proportioned to have substantially equal magnetic characteristics.

Windings 37 and 38 are placed upon the core portions 34 and 35 respectively, and the ends 39 and 40 of these windings are connected to the ends 41 and 42 respectively, of the secondary 43 of a transformer supplying the excitation current thereto. For this purpose, the primary 44 of the transformer is connected to the excitation source 45 which is similar to the source 20 shown in Fig. 2. The other ends 46 and 47 of the windings 37 and 38, respectively, are connected together and to the conductor 48 which forms one of the output conductors of the reproducing device. The other output conductor 49 is connected to the center tap 50 of the secondary 43 of the transformer.

The aforesaid windings 37 and 38 are wound so that the magnetic field set up by the current supplied thereto from the excitation source 45 will magnetize the core sections 34 and 35 in series, that is, when one end of the core portion 34 is magnetized to form a north pole, the corresponding end of the core portion 35 is magnetized to form a south pole. Thus, the magnetic flux set up in the windings 37 and 38 by the alternating current supplied by the source 45 will oscillate back and forth in the core portions 34 and 35 but will be confined to these core portions so that substantially no magnetic flux from these windings will pass through the other parts of the core 32 and through the magnetic record 10 positioned adjacent to the nonmagnetic gap 33.

The windings 37 and 38 are proportioned so that the current supplied thereto by the source 45 is more than sufficient to saturate the core portions 34 and 35 during the parts of the cycle that the excitation current reaches its maxima. However, the magnetic fields set up by the windings 37 and 38 are of opposite polarities, as described above, and the magnetic field set up in the core 32 by a magnetic record on the tape 10 positioned or passing over the air gap 33, opposes, alternately at the frequency of the excitation current, the excitation field set up by one of these windings and augments the excitation field set up by the other of these windings. As a result, a signal voltage corresponding to the signal recorded on the tape 10 is produced across the output terminals of the conductors 48 and 49. This output signal is modulated by the action of the excitation current in such a way that it comprises a series of pulses with a repetition rate or frequency of twice the frequency of the excitation current. The amplitudes of these pulses will of course be proportional to the intensity of the magnetic record being reproduced from the tape 10 and magnified in accordance with the operating principle of a magnetic amplifier, as explained above.

A reproducing device operating on the above described principles may also be used in the simultaneous reproduction of a plurality of magnetic recordings as recorded, for example, on a multiple-track magnetic record **10*a*. For such application (see Fig. 4), a plurality of magnetic cores 50*a*, 50*b*, 50*c*, etc. are provided, one for each of the multiple recordings, or tracks in the case of a multiple-track record, the cores being disposed in spaced parallel relation as shown, corresponding to the spacing of the recordings or tracks, and each core defining a flux path having a non-magnetic gap. Each core is formed with a T-shaped cross member (the cross members being designated 51*a*, 51*b*, 51*c*, etc.), the horizontal bars of the cross members bridging the sides of the core and the vertical legs of the cross members extending between the horizontal bars and the bottom side of the core, so as to form therewith, in conjunction with each core, two adjacent, closed magnetic paths with one common side, i. e. the vertical leg of the T-shaped cross member. One side of each core member bears an output winding (said output windings being designated 52*a*, 52*b*, 52*c*, etc.), and each output winding is individually connected to its own output circuit through its own rectifier. A common excitation winding 53 encircles the vertical legs of the cross members 51*a*, 51*b*, 51*c*, etc. of all the core members, and said winding is supplied from a common excitation source 54**.

The common excitation winding 53 generates a magnetic flux which saturates the adjacent closed flux paths of all the core members simultaneously in the manner explained above. As increments of the multiple recordings or of the multiple tracks of a multi-track record move across the gaps of the respective core members, flux passes through the flux paths of the core members in accordance with the intensity of magnetization of the respective tracks, and thereby voltages are induced in the respective output windings **52*a*, 52*b*, 52*c***, etc., also as explained above. It is of course to be understood that the voltage produced in any one output winding and its associated output circuit is, after demodulation, an amplified replica of the flux of the particular one of the magnetic recordings or tracks with which the core structure bearing said winding is associated, when said flux is considered in terms of voltage.

Without further analysis, it will be appreciated that the present invention provides a novel system and means for reproducing magnetic recordings which effects a notable simplification of the equipment required for this purpose, as well as improved reproduction stemming from its operation according to which the magnetic flux from the magnetic recording is coupled directly into the core of a magnetic amplifier and in such manner that said flux controls the output from the amplifier. The present invention also makes possible a new and improved method of reproducing by, as stated above, the procedure of coupling the flux which itself constitutes the magnetic recording directly into the core of a combined magnetic transducer-magnetic amplifier and utilizing the flux passing through said core to control the amplifier output in such manner that after demodulation, the output voltage is an amplified replica of the magnetic flux constituting the recording.

While I have described preferred embodiments of this invention in detail in the foregoing specification, it is of course understood that I do not desire to limit this invention to those details except insofar as they are defined by the following claims.

I claim:

1. Apparatus for simultaneously reproducing a plurality of magnetic recordings comprising a plurality of magnetic means, one for each recording, and each defining a flux path having a non-magnetic gap, means for positioning said recordings adjacent to and for moving them across the gaps, a plurality of output windings, one encircling each of said flux paths, each output winding being connected to its own output circuit, and an excitation winding common to all of said magnetic means and being connected to a source of alternating current, said excitation winding being positioned with respect to all said magnetic means in such manner as to excite one portion of each said magnetic means with a magnetic flux of a given polarity at the same time that it excites another similar portion of each of said magnetic means with a magnetic flux of similar intensity but of opposite polarity.

2. Apparatus for simultaneously reproducing a plurality of recordings previously recorded on a single magnetic record medium, comprising a plurality of magnetic means, one for each said recording, and each defining a flux path having a non-magnetic gap, means for positioning said record medium adjacent to and for moving it across said gaps, a single excitation winding coupled to all of said flux paths and connected to a source of alternating current, an output winding on each of said magnetic means connected to an output circuit individual thereto, said magnetic means and said excitation and output windings being electrically positioned and related to one another in such manner that energy is transferred from the source of alternating current via the flux paths to the several output circuits in quantities determined by the respective amounts of flux coupled into said magnetic means from said magnetic recordings.

3. A multiple magnetic reproducing head and magnetic amplifier, comprising a plurality of core structures of magnetic material each forming a closed loop with a bridge of magnetic material connecting diametrically opposite portions of each said loop, a pair of arms of magnetic material extending from respective portions of each loop spaced from the terminals of the respective bridge and the arms of each pair terminating adjacent one another to form between their terminals a nonmagnetic gap, a single excitation winding encircling all of said bridges, and individual signal output windings encircling respectively an individual arm of each pair.

References Cited in the file of this patent

UNITED STATES PATENTS

| | | |
|---|---|---|
| 2,418,553 | Irwin | Apr. 8, 1947 |
| 2,536,260 | Burns | Jan. 2, 1951 |
| 2,608,621 | Peterson | Aug. 26, 1952 |
| 2,700,703 | Nordyke | Jan. 25, 1955 |

FOREIGN PATENTS

| | | |
|---|---|---|
| 270,675 | Switzerland | Dec. 1, 1950 |